May 14, 1968

H. GEBLER ET AL 3,383,445
PROCESS FOR THE MANUFACTURE OF BIAXIALLY
STRETCHED POLYETHYLENE FILMS

Filed Dec. 16, 1964

INVENTORS.
HORST GEBLER
LUDWIG KLENK
WALTER SEIFRIED
KURT RICHARD
WILHELM MÜLLER

BY James E. Bryan ATTORNEY.

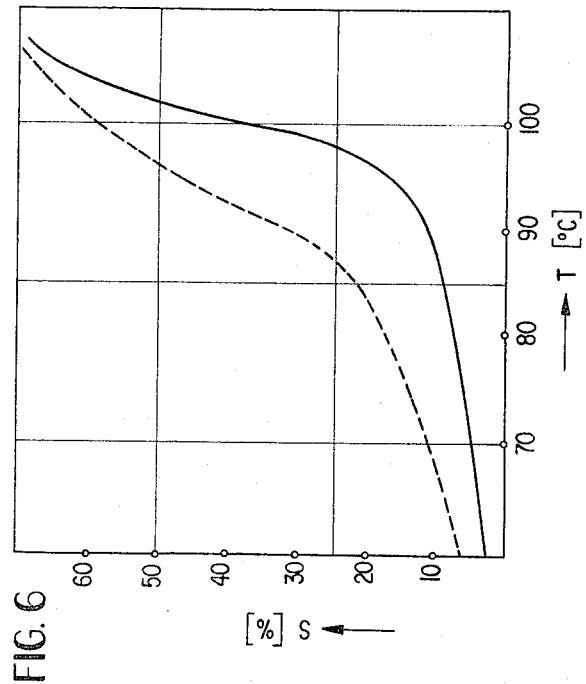
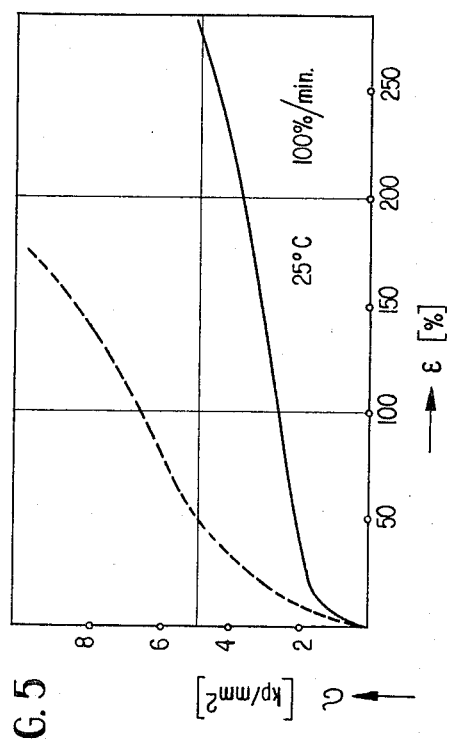
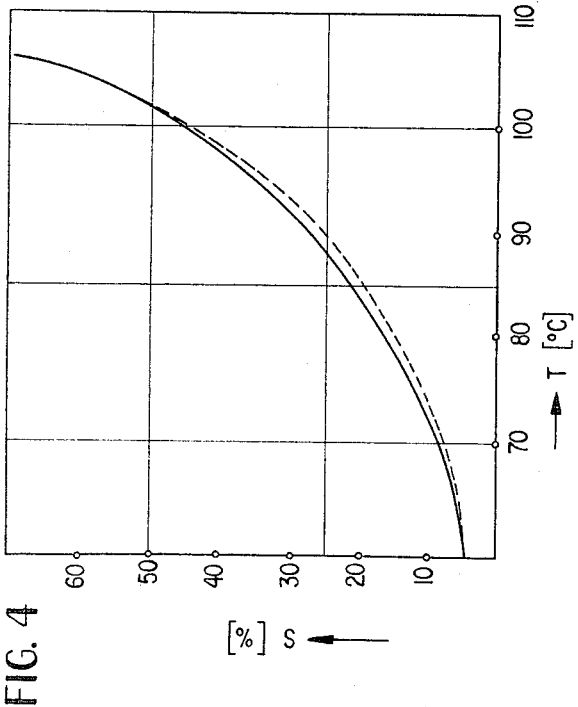

United States Patent Office 3,383,445
Patented May 14, 1968

3,383,445
PROCESS FOR THE MANUFACTURE OF BI-
AXIALLY STRETCHED POLYETHYLENE
FILMS
Horst Gebler, Ludwig E. H. Klenk, and Walter F. Seifried, Wiesbaden-Biebrich, and Kurt Richard, Bad Soden, Taunus, and Wilhelm Müller, Frankfurt am Main-Unterliederbach, Germany, assignors to Kalle Aktiengesellschaft, Wiesbaden-Biebrich, Germany, a corporation of Germany
Filed Dec. 16, 1964, Ser. No. 418,608
Claims priority, application Germany, Dec. 19, 1963, K 51,680
5 Claims. (Cl. 264—95)

ABSTRACT OF THE DISCLOSURE

This invention relates to a process for the manufacture of biaxially stretched polyethylene films in which high pressure polyethylene having a density less than 0.92 gram/cm.$^3$, a melt index of 0.2 to 0.4 gram/10 min. measured at 190° C., and an RSV value of 1.3 to 1.6 is extruded at a temperature not more than 90° C. above the melting point of the high-pressure polyethylene and which is advantageously between 150 and 200° C., the melt leaving the annular nozzle is cooled and at the same time formed into a tubular film at a blow ratio of 2.2 to 2.6 and a longitudinal drawing-off ratio of 1.5 to 1.9, the tube is cut into a flat film, the flat film thus obtained is stretched in two perpendicular directions, with stretch ratios of 2 to 4, at a temperature between the crystallite melting point of the high-pressure polyethylene and a temperature not more than 50° C. below the crystallite melting point, and the stretched film is then cooled under tension to a temperature below 40° C.

Figure 1:
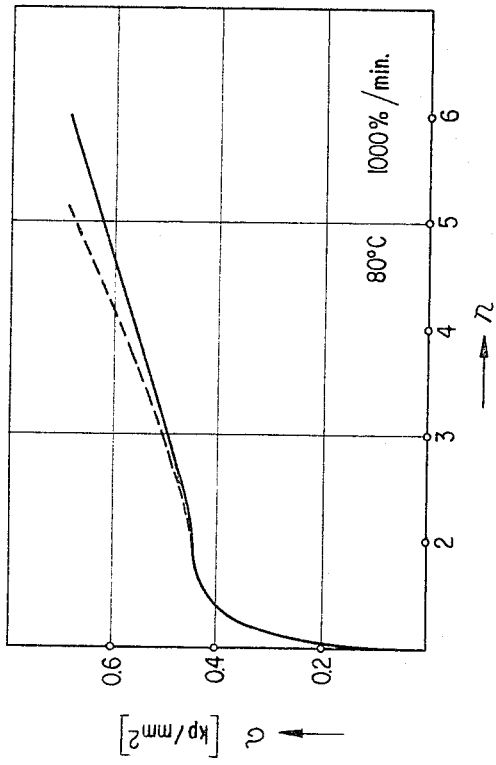

It is known that films having increased strength and shrinkage capacity can be made from high-density polyethylene, prepared by the low-pressure process, by one of the conventional stenter stretching processes. The initial film used in these processes is produced either by means of a slot die or by the tube blowing technique, the tube being slit either along one or both sides to produce a flat film. The biaxial stretching can be effected either simultaneously or in two or more stages. When these known stretching processes are applied to films made from high-pressure polyethylene, considerable difficulties arise because high-pressure polyethylene does not display the requisite viscoelastic behavior. In one known process, this difficulty is obviated by cross-linking the extruded high-pressure polyethylene primary film, this being effected, for example, by the action of high-energy radiation. However, the additional cross-linking stages involve the use of complex apparatus and are expensive.

It has now been found that the stretchability of high-pressure polyethylene films depends to a considerable degree on the material used to make the film and on the manner in which the primary film is manufactured.

The melt index referred to above is the index $i_2$ measured at 190° by ASTM method D 1238/59 T. The RSV value is the reduced viscosity $\eta_{red.}=\eta_{spec.}/c$., where $\eta_{red.}$ is the reduced viscosity, $\eta_{spec.}$ is the specific viscosity and c. is the concentration, the RSV value being determined at 135° C. with a 0.1 percent solution of the polymer in cis-decahydronaphthalene stabilized with 0.5 percent of phenyl-β-naphthylamine. The mean molecular weight of this high-pressure polyethylene is of the order of 50,000, generally between 45,000 and 65,000.

It has been found that a primary film made by the process of the invention displays balanced behavior with respect to its longitudinal and transverse tensile elongation and is thus eminently suitable for stretching. For example, at a temperature of 80° C. and an elongation speed of 1000 percent per minute, the film exhibits almost identical tensile elongation behavior in the longitudinal and transverse directions, there being no maximum at the yield point. It follows that stretching does not proceed from a necking zone and that after exceeding the yield point the tension $\sigma$ increases by at least 0.05 kp./mm.$^2$ per unit of increase in stretching ratio $\lambda$, which means that the film has the requisite increased strength.

In the production of the primary film by the tube blowing process, the high-pressure polyethylene having the properties indicated above is extruded, the melt is passed through an annular nozzle and then cooled immediately on the outside when it leaves the nozzle, for example, with air or nitrogen, and the tube thus formed from the solidifying melt is passed between a pair of nip rolls in known manner while maintaining a superatmospheric pressure within the tube, in which process the above-mentioned blow ratios and drawing-off ratios are observed.

As is known, the term "blow ratio" refers to the ratio of the tube diameter to the nozzle diameter. The drawing-off ratio is the ratio of the running speed of the film to the speed at which the melt leaves the nozzle.

The tube may be wound up in known manner and then converted into a flat film suitable for stretching (primary film) either by slitting along one side and opening or by slitting along both sides. Alternatively, the operation may be carried out continuously in that, on leaving the nip rolls, the tube is slit, opened if necessary, and then conducted directly to one or two stenters. The biaxial stretching may be carried out as a single stage operation or in two separate stages, for example first longitudinal stretching and then transverse stretching or vice versa. Simultaneous biaxial stretching and two-stage longitudinal-transverse stretching are frequently preferred to transverse-longitudinal stretching.

Stretching is advantageously carried out in a manner such that the primary film is heated to a temperature between the crystallite melting point of the high-pressure polyethylene and a temperature not more than 50° C. below such melting point, and is then stretched in two perpendicular directions at stretch ratios between 2 and 4. In the two-stage longitudinal-transverse stretching operation, longitudinal and transverse stretching are similarly effected at these temperatures and stretch ratios. In this process, the longitudinally stretched film is cooled to a temperature below 40° C., advantageously under tension and is then re-heated for transverse stretching, in which operation the temperature can be up to 5° C. higher than the longitudinal stretching temperature. Finally, the biaxially stretched film is cooled to a temperature below 40° C. under tension. The sequence of the two stretching stages may be reversed.

The following examples illustrate the invention, being described with reference to the accompanying drawings (see below):

Example 1

High-pressure polyethylene having a density of 0.918, a melt index of 0.3 and an RSV value of 1.46, corresponding to a mean molecular weight of about 50,000 was extruded at a temperature of 180° C. through a screw extruder having a diameter of 45 mm. and a screw length 20 times the diameter, and then through a blow head having a diameter of 75 mm. and a nozzle width of 0.6 mm. The extruded tube was widened to 2.4 times its original diameter and then wound up. A drawing-off ratio of 1.7 was established by a draw-off speed of 3.1 meters/min. The wound up tube was then passed over a cutting device where it was converted into a flat film 250 mm. wide and 130 to 140μ thick by slitting on both sides and then rewound.

The flat film was conducted to a stenter designed for simultaneous two-way stretching and stretched longitudinally and transversely at 90 to 95° C. at a linear stretch ratio in both directions of 2.5. A film 15μ thick was obtained.

FIGURE 1 of the accompanying drawings is a graph relating to the unstretched primary film showing how the tensile stress is dependent on the stretch ratio, the tensile stress $\sigma$ in kp./mm.$^2$ being plotted on the ordinate and the stretch ratio $\lambda$ on the abscissa. The values apply to a stretching temperature of 80° C. and a stretching rate of 1000 percent per min. The solid line is the curve for longitudinal stretch and the dashed line is the curve for transverse stretch.

Figure 2:
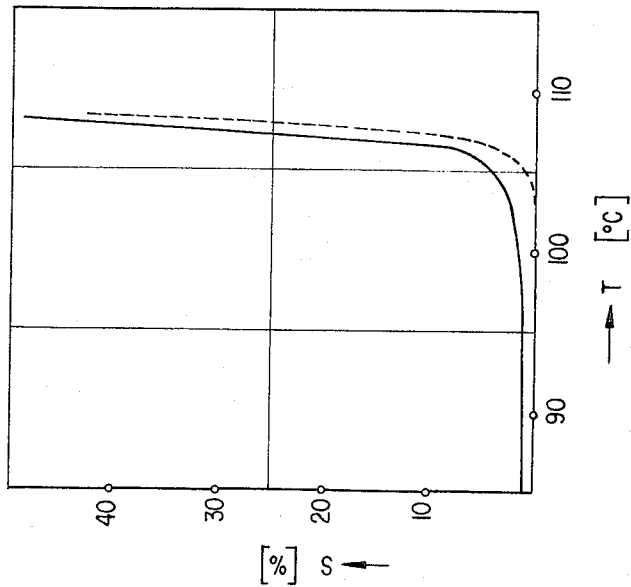

FIGURE 2 is also a graph relating to the unstretched primary film. It shows the degree of shrinkage S in percent in relation to shrinkage temperature T (temperature of bath) when the film is immersed for 1 minute in a bath of triglycol, the solid line showing longitudinal shrinkage and the dashed line transverse shrinkage.

From FIGURES 1 and 2 it can be seen that there is a large measure of agreement between the behavior of the film as regards the properties indicated in the longitudinal and transverse directions.

Figure 3:
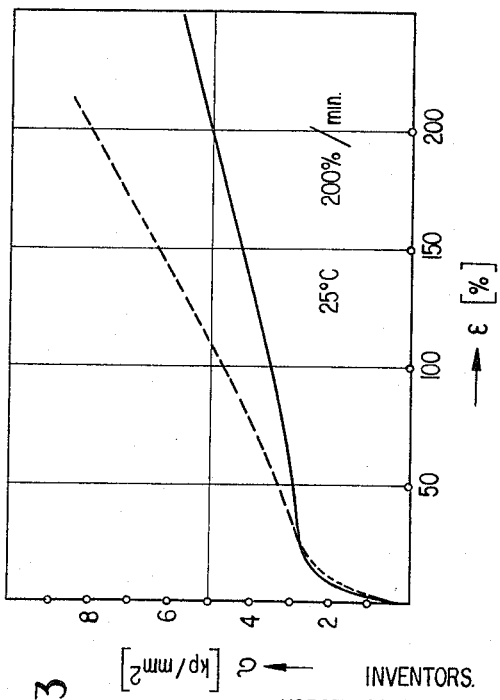

FIGURE 3 relates to the stretched film. It shows the dependence of tensile strength $\sigma$ in kp./mm.$^2$ as a function of elongation $\epsilon$ in percent. The values apply to a temperature of 25° C. and an elongation rate of 200%/min. The solid line refers to the longitudinal direction and the dashed line to the transverse direction. It can be seen that the stretched film has a tensile strength of more than 6 kp./mm.$^2$ in both the longitudinal and transverse directions, and is thus far superior to the unstretched film in this respect.

FIGURE 4 also relates to the stretched film. It shows the degree of shrinkage S in relation to shrinkage temperature T under the conditions indicated for FIGURE 2. The solid line shows longituudinal shrinkage and the dashed line transverse shrinkage. It can be seen that the stretched film has a substantial and balanced shrinkage capacity, even at temperatures below 100° C., compared with the unstretched film (FIGURE 2).

Example 2

High-pressure polyethylene having the properties indicated in Example 1 was extruded by a screw extruder having a diameter of 60 mm. and a screw length of 20 times the diameter, and then through a blow head having a diameter of 165 mm. and a nozzle width of 0.6 mm. The draw-off speed was 3.0 meters/min. and the drawing-off ratio 1.67. The film was slit to a width of 470 mm. The thickness of the film was 150μ.

The primary film thus produced was heated to a temperature of 96.5° C. in contact with rolls and stretched to a longitudinal ratio of 2 at a draw-off rate of 20.3 meters/min. The longitudinally stretched film was then cooled to a temperature of about 20° C., reheated to 97° C., and then stretched transversely at a transverse stretch ratio of 3.6. After cooling to 30° C. under tension, the film, having a thickness of about 18μ, was conducted to a winding-up device.

FIGURES 5 and 6 show the $\sigma/\epsilon$ and $S/T$ curves corresponding to FIGURES 3 and 4, except that the $\sigma/\epsilon$ curve in FIGURE 5 refers to an elongation rate of only 100%/min. FIGURES 5 and 6 also show the improvement in the mechanical properties and shrinkage capacity displayed by the stretched film.

It will be obvious to those skilled in the art that many modifications may be made within the scope of the present invention without departing from the spirit thereof, and the invention includes all such modifications.

What is claimed is:

1. A process for the manufacture of a biaxially stretched polyethylene film which comprises extruding a tube of high-pressure polyethylene having a density less than 0.92 gram/cm.$^3$, a melt index of 0.2 to 0.4 gram/10 min. measured at 190° C., and an RSV value of 1.3 to 1.6, the extrusion being performed at a temperature not more than 90° C. above the melting point of the polyethylene, cooling the melt, forming a tubular film by inflating at a blow ratio of 2.2 to 2.6 and a drawing-off ratio of 1.5 to 1.9, cutting the tube to form a flat film, stretching the flat film in two perpendicular directions at stretch ratios of 2 to 4 at a temperature between the crystallite melting point of the high-pressure polyethylene and a temperature not more than 50° C. below said melting point, and cooling the stretched film under tension to a temperature below 40° C.

2. A process according to claim 1 in which the extrusion temperature is in the range of 150 to 200° C.

3. A process according to claim 1 in which the flat film is simultaneously stretched in two perpendicular directions.

4. A process according to claim 1 in which the flat film is first stretched longitudinally, cooled to a temperature below 40° C. under tension, reheated to a temperature not more than 50° C. below the crystallite melting point of the polyethylene and stretched transversely, and cooled to a temperature below 40° C. under tension.

5. A process according to claim 4 in which the transverse stretching temperature is up to 5° C. above the longitudinal stretching temperature.

References Cited

UNITED STATES PATENTS

| 2,412,187 | 12/1946 | Wiley et al. | 264—210 |
| 2,461,975 | 2/1949 | Fuller | 264—95 |
| 3,177,277 | 4/1965 | Adams et al. | 264—210 |

FOREIGN PATENTS

| 670,551 | 9/1963 | Canada. |
| 1,024,619 | 4/1953 | France. |
| 1,274,521 | 9/1961 | France. |

ROBERT F. WHITE, *Primary Examiner.*

A. R. NOE, *Assistant Examiner.*